Jan. 4, 1944. R. D. McINTOSH 2,338,291
TWO-WAY STRAINER
Filed July 21, 1941
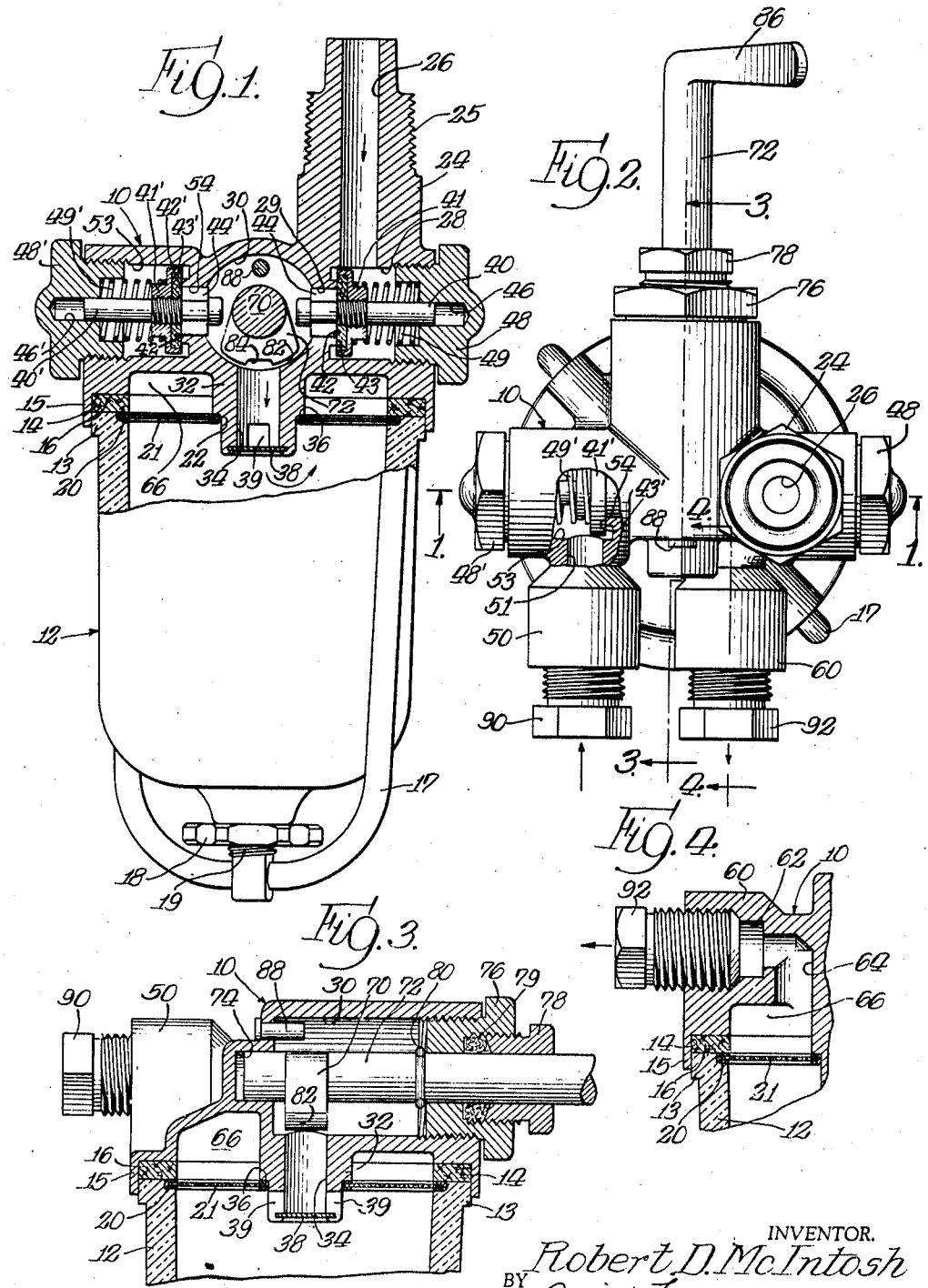
INVENTOR.
Robert D. McIntosh
BY Bair + Freeman
Attys.

Patented Jan. 4, 1944

2,338,291

UNITED STATES PATENT OFFICE 2,338,291

TWO-WAY STRAINER

Robert D. McIntosh, Chicago, Ill., assignor to The Imperial Brass Manufacturing Company, Chicago, Ill., a corporation of Illinois Application July 21, 1941, Serial No. 403,391

3 Claims. (Cl. 210—166)

My invention relates to strainers and particularly strainers for use in fuel lines of combustion engines.

Among the objects of my invention is to provide a new and improved two-way strainer which is capable of straining two different kinds of liquid fuels and passing one fuel or another from the fuel tank to the carburetor of a combustion engine.

Another object of my invention is to provide a new and improved two-way fuel strainer which has a convenient control for switching from one type of fuel to the other, arranged in such a way that the flow of fuel may be switched from one type to another by a single movement of the control. There is also included among the objects of my invention a strainer control which is capable of shutting off both types of fuel from passage through the strainer.

Also among the objects of my invention is to provide a new and improved simplified construction for a fuel strainer wherein fuel of different types entering the strainer through separate passages join in a common passage after being introduced and are passed outwardly from the strainer in a common passage.

With these and other objects in view, my invention consists in the construction, arrangement and combination of the various parts of my two-way strainer, whereby the objects contemplated are attained, as hereinafter more fully set forth, pointed out in my claims, and illustrated in the accompanying drawing, in which:

Figure 1 is a vertical section taken on the line 1—1 of Figure 2 showing my improved two-way strainer.

Figure 2 is a top view of the strainer shown partly in section.

Figure 3 is a vertical section through the body of the strainer taken on the line 3—3 of Figure 2.

Figure 4 is a fragmentary sectional view on the line 4—4 of Figure 2.

The present strainer comprising my invention is designed chiefly for use on combustion engines which use two types of liquid fuel. Combustion engines of such kinds are found to be very useful on tractors and farm equipment where power and economy of operation are the first requisites. Combustion engines on farm tractors, for example, frequently use gasoline for starting the engine and thereafter are switched to kerosene for driving the engine after it has been warmed up. It is also true that the liquid fuel supplies for farm equipment frequently become contaminated with dust, grit and other substances. Under storage conditions on the farm and in use, it is often difficult to keep the fuel supply clean.

Also when an engine of this kind is used to burn inferior grades of fuels, such as kerosene, it is advisable to keep the fuel supply just as clean as possible from any sort of solid impurities to promote uninterrupted and efficient operation at all times.

In addition, since these engines are operated in most instances by persons not trained in the mechanics of combustion engines, it is desirable to have all controls and adjustments for those engines, such as strainer valves, so convenient to operate and service, that a person only casually acquainted with the mechanics of combustion engines is able to operate them, take them apart and clean them and re-assemble them in the proper way.

With these requisites in mind, I have provided a two-way fuel strainer comprising a strainer body 10 and a strainer bowl 12 attached to the body. The bowl is usually made of glass and has an upper rim 13 which fits into a recess 14 formed by a flange 15 on the bottom of the strainer body. A packing ring 16 is provided to seal the joint between the bowl and the strainer body. A swivel yoke 17 is attached to the strainer body and extends around the bottom of the bowl. A clamping nut 18 is mounted on a threaded shank 19 secured to the bottom of the yoke and is designed to be screwed upwardly into contact with the bottom of the bowl in order to securely fasten it in place.

In the upper rim of the bowl, there is provided an annular recess 20 in which is set a screen 21 provided with a central aperture 22. The screen effectively covers the top of the bowl.

On the upper side of the strainer body, there is an upwardly extending projection 24 threaded at 25 so that it can be readily attached to some fitting on the underside of a fuel tank, for example. There is an inlet passage 26 through the projection for conducting one type of liquid fuel into the strainer body.

The inlet passage 26 communicates with a valve chamber 28 and the valve chamber in turn communicates with a cam chamber 30 through a passage 29. Beneath the cam chamber is a boss 32 having within it a passage 34 connecting the cam chamber with the interior of the strainer bowl. The boss is provided with a shoulder 36 designed to receive the screen at the open central portion. At the lower end, the boss is provided with a small disc 38 forming a baffle, closing the lower end of the passage 34. On opposite sides of the baffle are milled slots 39, forming lateral vents for passing liquid into the bowl. By deflecting the liquid sidewise, sludge previously deposited at the bottom of the bowl is not stirred up by the constant flow of liquid.

In the first valve chamber 28, there is provided a valve stem 40 which has at one end a cup-shaped member 41 within which is positioned a packing 42 forming a valve designed to be pressed against a valve seat 43 formed in the bottom of the first valve chamber. A spider 44 guides the valve in place and helps to tighten the valve upon the stem. The valve stem itself projects into the cam chamber 30.

At its opposite end, the valve stem is received in an aperture 46 formed in a cap 48 which is insertable threadably within the valve chamber. A coiled spring 49 is positioned between the cap and cup-shaped member and normally urges the member and valve into a seated position against the valve seat, thereby preventing flow of liquid fuel from the inlet passage 26 to the strainer bowl.

A lateral boss 50 shown best in Figure 2 is provided within which is a second inlet passage 51 for conducting fuel of a second type into the body of the strainer. The second inlet passage communicates with a valve chamber 53 and thence with the cam chamber 30 through a passage 54. From the cam chamber, the second inlet passage communicates with the strainer bowl in the same manner as the first inlet passage.

Positioned in the second valve chamber is a corresponding cup-shaped member 41' for mounting a packing 42' comprising the valve which similarly sets upon a valve seat 43' in the second valve chamber. A similar cap 48' is threadably engaged within the valve chamber and has in it an aperture 46' for receiving a valve stem 40' to which is secured the cup-shaped member and valve in a manner similar to that described for the first mentioned valve by means of a spider 44'. A corresponding coiled spring 49' normally urges the valve to a closed or seated position.

Another lateral boss 60, shown in Figures 2 and 4, has in it an outlet passage 62 communicating with an intermediate, L-shaped passage 64 through which fuel flows outwardly from the strainer from an annular space 66 within the body above the screen 21.

For operating the respective valves, a cam element 70 is mounted on a cam shaft 72 journaled at its inside end within a recess 74.

The cam chamber 30 has an opening at one side, as seen best in Figure 3, in which is threadably mounted a packing nut 76 provided with a packing gland 78 having a cup-shaped inner end for securing a packing 79 around the cam shaft. A split ring 80 is found useful in retaining the cam shaft in position within the cam chamber. The cam element 70 has on the lower edge as viewed in Figures 1 and 3 a cam face 82 and in the cam face is a notch 84. At the outside end of the cam shaft is provided a handle 86 for manual operation. For preventing rotation of the cam beyond a valve open position in either side, there is provided a pin 88 for engaging one side or another of the cam, depending on which way it is being turned. This pin 88 is located immediately above the cam.

In operating my device, the threaded boss 24 is normally attached to the inner side of a kerosene tank on a tractor. At the same time, a fuel line is connected between the boss 50 and a gasoline tank by means of a coupling nut 90. Also by means of a coupling nut 92 the outlet passage 62 is connected to a fuel line which leads to the carburetor of the combustion engine. When all connections are made, the strainer is ready for operation. Initially, the handle 86 is turned so that the cam element 70 rotates in a clockwise direction as viewed in Figure 1. When so rotated, the left side of the cam face engages the adjacent valve stem 40' and moves it from right to left, lifting the valve 42' from its seat. Thereupon gasoline may flow through the second inlet passage 51, through the second valve chamber 53 and thence into the cam chamber 30. From here it passes downwardly through the passage 34 and slots 39 into the strainer bowl. Within the strainer bowl, sediment which may be in the liquid fuel has an opportunity to settle out and the liquid fuel thus settled passes upwardly through the screen 21 into the annular space 66 and thence outwardly through the intermediate passages 64, the outlet passage 66 and thence to the carburetor of the engine.

After the engine has started it becomes desirable to switch from gasoline to kerosene or some cheaper grade of fuel. To make the change, the cam shaft and cam element 70 are rotated in a counter-clockwise direction as viewed in Figure 1. As soon as the cam face 82 passes out of contact with the adjacent valve stem 40', the valve is automatically closed by means of the coiled spring 49'. Continuing rotation of the cam element 70 forces the cam face 82 against the adjacent end of the valve stem 40, moving it from left to right as viewed in Figure 1, thereby opening the valve.

When the valve has thus been operated, kerosene is permitted to flow through the first valve chamber 28 and thence through the passage 29 into the cam chamber 30. Here again the liquid fuel passes downwardly through the passage 34, the screen 38 and thence into the strainer bowl. From the strainer bowl, the kerosene passes upwardly through the screen 21, the annular chamber 66 and thence outwardly through the intermediate passage 64 and outlet passage 62 in the same manner as described for the passage of gasoline outwardly from the strainer member.

By providing a notch 84 in the cam face 82, an operator is able to either feel or hear the click when the cam face is in full contact with the proper valve stem and he can then be sure that the passage has been opened to the fullest extent, allowing the selected type of fuel to pass through the strainer. When the cam is rotated in reverse direction to switch the supply of fuel, a click can be felt when the cam element passes beyond control of the valve and another click when the cam element engages the other valve stem, opening it to its fullest extent. A single handle 86 serves the purpose of opening both valve stems which alternatively control the supply of different types of fuel to the strainer bowl and thence to the combustion engine. Moreover, the different types of fuel are mixed within the strainer bowl so that there is no sudden switch from pure gasoline to pure kerosene, or vice versa. As the switch is made from gasoline to kerosene, kerosene enters the strainer bowl before it has been emptied of gasoline and there is a mixture of the two, making a gradual switch from one to the other.

As it will be apparent from the drawing, especially Figure 1, both valves can be so operated as to automatically close when the cam element is moved to a downward direction. Also it is a simple matter to clean the valve body since it is necessary only to unscrew either or both of the caps 48 and 48', withdraw the respective valve stem and accompanying valve members and then reinsert the same after a proper cleaning or flushing of the interior of the valve body. The strainer is furthermore made of a design which permits it to be located in plain-sight beneath one of the fuel tanks where the operator has ready access to the valve handle for switching it from one supply to the other and where the operator, when cleaning is necessary, has ready access to the clamping nut 18 for releasing the strainer bowl, also, for cleaning.

There has thus been provided a two-way strainer which is simple in its operation and easy to disassemble, clean and re-assemble in its proper form.

Some changes may be made in the arrangement and construction of the various parts of my two-way strainer, without departing from the real spirit and purpose of my invention, and it is my intention to cover by my claims, any modified forms of structure or use of mechanical equivalents, which may be reasonably included within their scope.

I claim as my invention:

1. In a two-way strainer device having a single control element for separate passages therein, the combination of a strainer bowl and a body having a sealed attachment to the rim of the bowl, said body having a first passage therethrough, a valve chamber communicating with the passage, and a valve in said chamber normally urged to a closed position, a cam chamber communicating with said valve chamber, a body outlet passage communicating between the cam chamber and the bowl, a second passage and second valve chamber in said second passage communicating therewith and communicating with said cam chamber, a valve in said second valve chamber normally urged to a position closing communication between the respective valve chamber and the cam chamber, said valves each having a stem projecting into said cam chamber, a cam element and a shaft rotatably supporting the cam element in said cam chamber, said shaft being rotatably sealed in place and a cam face on said cam element normally positioned intermediate the valve stems and having alternative rotated positions engaging said respective valve stems for opening the corresponding valve and admitting an appropriate fluid to the bowl through said cam chamber, said body having a common strainer outlet for conducting strained fluid from the bowl and a strainer element in the bowl between the cam chamber and the strainer outlet.

2. A two-way strainer device having a single control element for controlling passage of fluid therethrough, comprising a strainer bowl and a body having a sealed attachment to the rim of the bowl, a projection on the body having an inlet passage for one type of fluid, said body having a first valve chamber communicating with the passage, a cam chamber communicating with said valve chamber, a body outlet passage communicating with the cam chamber and the bowl, a second inlet passage, a valve chamber connected with the second inlet passage and communicating therewith and with said cam chamber, and a spring-pressed valve in each said valve chamber normally urged to a position closing communication between the respective valve chamber and the cam chamber, said valves each having a stem projecting into the cam chamber, and a cap threadably engaging the walls of each chamber for securing each respective valve in place, a cam element in said cam chamber having a shaft and packing for rotatably mounting the shaft on the body and a cam face having a notch thereon normally positioned intermediate the valve stems and having alternative rotated positions engaging said respective valve stems for shifting the respective valves and admitting a corresponding fluid to the bowl through said cam chamber, said body having a common strainer outlet for conducting strained fluid from the bowl, and a strainer element in the bowl between the cam chamber and the strainer outlet.

3. A two-way strainer device having a single control element for controlling passage of fluid therethrough, comprising a strainer bowl and a body having a sealed attachment to the rim of the bowl, a screen at the top of the bowl having a central opening, a projection on the body having an inlet passage for one type of fluid, said body having a first valve chamber communicating with the passage, a cam chamber communicating with said valve chamber, a body outlet passage communicating with the cam chamber and having lateral vents communicating with the bowl through the central opening of the screen, a second inlet passage and valve chamber communicating therewith and communicating with said cam chamber, a spring-pressed valve in each said valve chamber normally urged to a position closing communication between the respective valve chamber and the cam chamber, each said valve having a stem projecting into said cam chamber and a cap threadably engaging the walls of each chamber for securing the respective valve in place, a cam element in said cam chamber having a shaft and packing for rotatably mounting the shaft on the body and a cam face having a notch thereon normally positioned intermediate the valve stems and having alternative rotated positions engaging said respective valve stems for admitting a corresponding fluid to the bowl through said cam chamber, said body having an annular space above the screen and a common strainer outlet for conducting strained fluid from the bowl, said screen being positioned between the cam chamber and said strainer outlet.

ROBERT D. McINTOSH.